Patented Sept. 15, 1925.

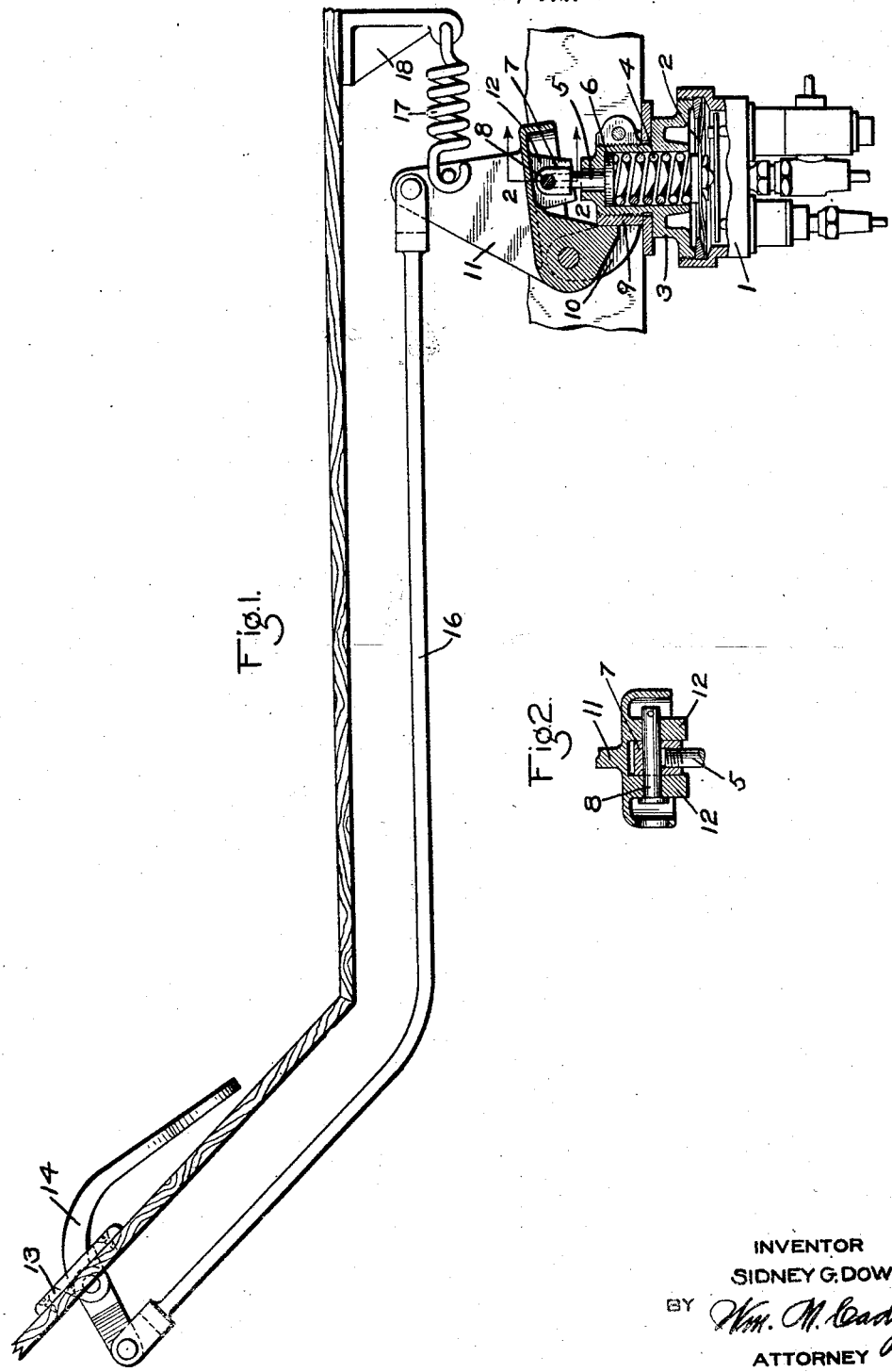

1,553,600

UNITED STATES PATENT OFFICE.

SIDNEY G. DOWN, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

SAFETY AUTOMOTIVE BRAKE.

Application filed December 22, 1923. Serial No. 682,337.

*To all whom it may concern:*

Be it known that I, SIDNEY G. DOWN, a citizen of the United States, residing at Pittsburgh, in the county of Allegheny and State of Pennsylvania, have invented new and useful Improvements in Safety Automotive Brakes, of which the following is a specification.

This invention relates to vehicle brakes, and more particularly to a fluid pressure brake for a motor vehicle.

The principal object of my invention is to provide a fluid pressure brake for a motor vehicle in which the brakes will be automatically applied in case the operator becomes incapacitated or removes his foot from the control pedal.

In the accompanying drawing; Fig. 1 is an elevational view of a brake valve device for controlling the fluid pressure brakes of a motor vehicle, showing my invention applied thereto; and Fig. 2 a section on the line 2—2 of Fig. 1.

The brake valve device may comprise a casing 1 containing a flexible diaphragm 2 for operating valves for controlling the admission and release of fluid under pressure to and from a brake chamber for effecting the application and release of the brakes. Downward movement of the diaphragm 2 operates to close the exhaust valve and open the fluid pressure supply valve and upward movement of the diaphragm operates to close the supply valve and open the exhaust valve.

In a central chamber of the cover plate 3 is mounted a coil spring 4. A stem 5 extending upwardly through a central opening in the cover plate 3 is provided at its lower end with a plate 6 which acts as an abutment for the spring 4. Secured to the upper end of stem 5 is a head 7 bored to receive a pin 8.

On a sleeve 9, carried by the cover plate 3, is provided lugs 10, between which an operating arm 11 is pivotally mounted. The arm 11 is provided with depending lugs 12 bored to receive the pin 8.

Pivotally mounted on a floor plate 13 secured to the floor board 14 of the motor vehicle is a pedal lever 15 and said pedal lever is operatively connected to the arm 11 by a rod 16. A spring 17, having one end fixed to a bracket 18, is secured to the arm 11 in such a way that the spring tends to pull the arm toward the right.

When the pedal lever 14 is held depressed in the position shown in Fig. 1, the arm 11 is operated through the rod 16, against the resistance of spring 17, to raise the stem 5, so that the spring 4 is relieved of pressure and the diaphragm 2 is therefore not subjected to the pressure of the spring.

The diaphragm can therefore assume the upper position, as shown in the drawing, in which the exhaust valve is opened and the fluid pressure supply valve is held closed and consequently the fluid pressure brakes are held released so long as the operator holds the pedal 14 depressed.

If the operator desires to apply the brakes, he lifts his foot so as to permit the foot lever to rise to a certain extent, depending upon the pressure desired in applying the brakes. The upward movement of the pedal 14 permits the movement of the arm 11 by the action of spring 17, so that spring 4 is compressed to a certain degree.

The diaphragm 2 is then moved by the pressure of spring 4 so as to first close the exhaust valve and then open the fluid pressure supply valve to supply fluid for effecting an application of the brakes. The fluid pressure supplied to apply the brakes acts on the under face of diaphragm 2, so that when the braking pressure has been increased to a predetermined degree, slightly exceeding the pressure of spring 4, the diaphragm 2 will be moved upwardly so as to close the fluid pressure supply valve.

The braking pressure may be increased by allowing the pedal 14 to rise further, so as to permit a further movement of the arm 11 by the action of the spring 17, and thus causing a further compression of spring 4.

In addition to the normal control of the brakes, as above described, by moving the pedal 14, if the operator should remove his foot from the pedal, as in a case where he becomes incapacitated, the spring 17 will act to pull the arm 11 toward the right and thus effect the compression of spring 4. When the spring 4 is compressed, the diaphragm 2 is actuated to effect the opening of the fluid pressure supply valve and the consequent application of the brakes, as hereinbefore described.

Having now described my invention, what I claim as new and desire to secure by Letters Patent, is:—

1. The combination with a brake valve device including a diaphragm, a spring acting on said diaphragm, and means operative to compress said spring, of a second spring acting on said means to compress the first spring and manually controlled mechanism operable to oppose the action of said second spring on said means.

2. The combination with a brake valve device including a diaphragm and a spring acting on said diaphragm, of an arm movable in one direction to compress said spring and movable in the opposite direction to release the spring, a second spring connected to said arm and tending to move same in one direction, and a foot pedal connected to said arm and operative to move said arm in the opposite direction.

In testimony whereof I have hereunto set my hand.

SIDNEY G. DOWN.